Nov. 5, 1968  S. D. DE LAJARTE  3,409,423
METHOD AND APPARATUS FOR MANUFACTURE OF FLAT GLASS
Filed April 14, 1964
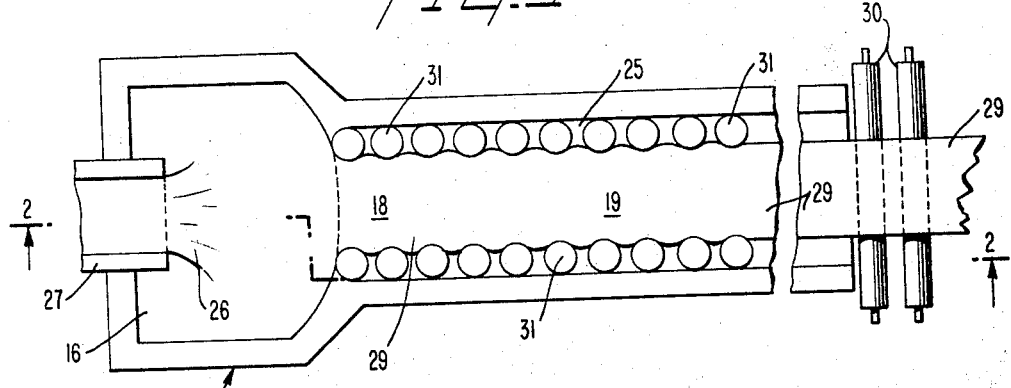
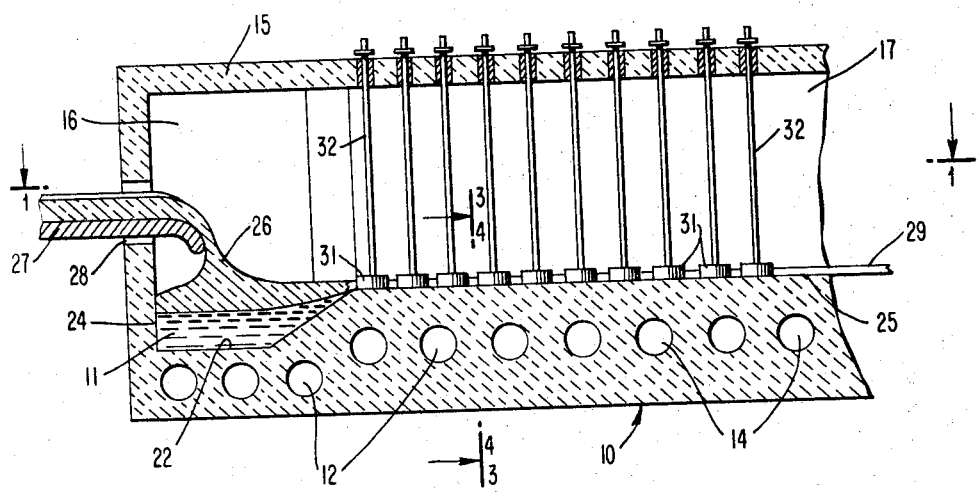
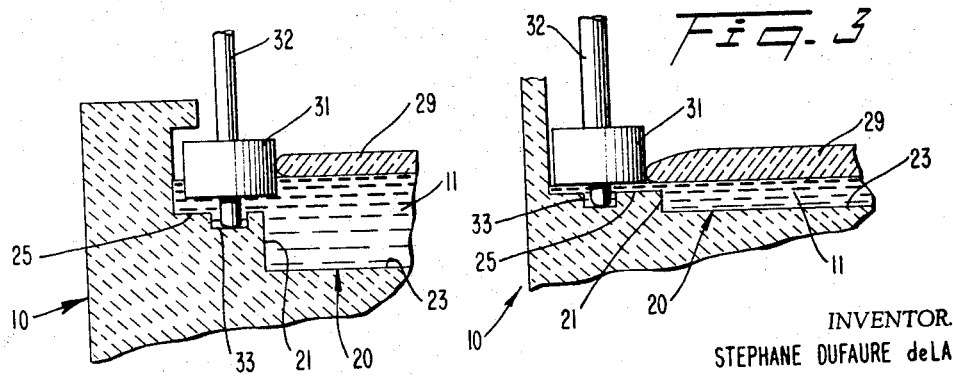
INVENTOR.
STEPHANE DUFAURE de LAJARTE
BY Bauer and Seymour
ATTORNEYS

United States Patent Office 3,409,423
Patented Nov. 5, 1968

3,409,423
METHOD AND APPARATUS FOR MANUFACTURE OF FLAT GLASS
Stephane Dufaure de Lajarte, Paris, France, assignor to Compagnie de Saint-Gobain, Neuilly-sur-Seine, France
Filed Apr. 14, 1964, Ser. No. 359,659
Claims priority, application France, Apr. 16, 1963, 931,627
20 Claims. (Cl. 65—65)

This invention relates to the manufacture of sheet or flat glass which may be either plane or curved.

One of the objects of the present invention is to provide a novel method for the production of fire polished sheets of glass and novel apparatus for practicing the same.

It is known that sheet or flat glass made in accordance with conventional rolling and drawing processes practiced with conventional apparatus wherein the glass comes into contact with mechanical parts generally has surface defects which must be corrected in a manner which involves further mechanical handling, softening and polishing. Additionally, when molten glass is drawn or otherwise formed into sheets by present conventional methods, the chemical heterogeneity and the thermal characteristics of the glass sheet are apt to cause undesirable alterations in its flatness or desired curvature.

It is, therefore, another object of the invention to provide a novel process and novel apparatus for overcoming the foregoing defects in the manufacture of sheets of glass and to thereby reduce the time and cost of production while at the same time improving the quality of the product.

A further object is to provide novel apparatus which functions in a novel manner to control the dimensions and movement of a sheet of glass floating on a body of liquid, such as molten metal, in the process of formation form a supply of molten glass.

Still another object is to provide novelly constructed apparatus for making flat or sheet glass wherein the broad surfaces of the sheet are kept out of contact with any solid or rigid bodies or parts until the sheet has been progressively cooled sufficiently to obviate the infliction of surface defects by such bodies and parts.

A still further object is to provide novel apparatus for making sheets of glass in accordance with a novel process which may be practiced with a supply of molten glass having a lower initial viscosity than is suitable for similar known processes, whereby the production rate is enhanced without danger of unpriming or breaking the continuity of the sheet.

Another object is to provide novel means for producing by the liquid flotation method sheets of glass which are thicker and of better quality than sheets heretofore produced with similar known apparatus.

A further object is to provide novel means and method utilizing the liquid flotation process for forming glass sheets, whereby the latter may be moved from the input to the delivery end of the treating oven at a greater speed than has been heretofore possible with known apparatus.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a somewhat diagrammatic plan view of one form of apparatus contemplated by the invention, the view being taken in the plane of line 1—1 of FIG. 2;

FIG. 2 is a partial sectional view of the apparatus of FIG. 1, the section being taken substantially on line 2—2 of FIG. 1; and FIGS. 3 and 4 are detail sectional views illustrating suitable modifications adapted to the apparatus of FIG. 2, as viewed in the plane of line 3—4 of FIG. 2.

The embodiment of the novel apparatus illustrated, by way of example, in FIGS. 1 and 2 for practicing the method contemplated by the invention comprises an oven or tank 10, the floor and lateral walls of which are made of suitable refractory materials. The tank may, for example, be assembled from graphite blocks to form a tight container for a liquid, such as molten metal 11. The base or floor of the tank is pierced with transverse passages in which suitable known types of heating units 12 and cooling units 14 are installed, the distribution and nature of these heating and cooling units being determined by the particular requirements for progressively cooling the glass to be treated within the oven. A tight cover or canopy 15 is provided over the tank 10 to permit the maintenance of a controlled atmosphere within the enclosure to obviate oxidation of the bath 11 when oxidizable molten metal is used and to prevent undesirable reactions between the glass and the liquid supporting bath. The controlled atmosphere is neutral and preferably reducing, and may, by way of example, be the product resulting from the cracking of ammonium gas.

As illustrated, oven 10 comprises a relatively wide pre-forming or spreading compartment or cell 16 and an elongated corridor 17, the left hand portion of which may be regarded as a forming zone 18, and the adjacent portion to the right may be termed a cooling zone 19. There is no sharp division between these zones, and the temperature variation required for progressive cooling of the treated glass may vary in different furnaces or in the same furnace for different products.

In accordance with the embodiment of FIG. 3, the sole or floor of tank 10 within corridor 17 is provided with a centrally disposed groove or trough 20, the longitudinal sides 21 of which are preferably parallel and spaced inwardly from the side walls of the oven. The floor 22 within compartment 16 is shown at a lower level than the bottom 23 of trough 20 and preferably has an inclined portion which intersects the left-hand edge of the floor of the trough to form a well 24. The trough and well confine a mass or body of liquid 11 consisting of a material having a melting point below that of glass and a specific gravity greater than glass. Molten tin is satisfactory for the purpose, and the quantity thereof is so maintained that the upper level of the molten metal or other liquid in trough 20 is at least slightly above the floor 25 of the corridor 17 at each side of trough 20, overflow being prevented by the capillarity of the liquid mass 11.

Molten glass 26, ready for conversion to sheets, may be supplied in bulk form to pre-forming cell 16 by means of a trough or channel 27 projecting through a slot 28 in the end wall of the oven. The glass is flowed onto the surface of the supporting liquid 11 and spreads thereon within the confines of cell 16 to a thickness which may be greater than would result from free spreading of glass having the same or comparable viscosity on a liquid surface. From cell 16 the molten glass flows into corridor 17 on the surface of liquid 11 in the form of a sheet or ribbon 29 of substantially uniform thickness having a width less than the internal width of the corridor 17. Novel means are provided for controlling the width and hence, the thickness of the ribbon 29 of glass and for controlling the speed at which the ribbon is caused to move through corridor 17 and onto suitable conveyor means diagrammatically illustrated in the drawings as horizontal rollers 31. In the form shown, such width and movement controlling means comprises a series of rollers 31 at each side of corridor 17, the axes thereof being vertical, or if desired, at an angle to the vertical. Rollers 31 are preferably fixed on shafts 32 which project downwardly beyond the rollers into cavities 33 in floor 25 and upwardly through suitable bearings in canopy 15. The shafts 32 may be tubular to permit the circulation of water or other cooling medium therethrough. Rollers 31 are mounted to engage the side edges of glass ribbon 29 and thereby prevent lateral flow or expansion of the ribbon appreciably beyond the edges of the liquid medium 11 in trough 20. To the extent that ribbon 29 extends beyond the edges of the liquid bath, it is supported by inherent capillary action or superficial tension.

The ribbon width controlling rollers 31 may be mounted to rotate freely and thus offer little or no resistance to the flow or movement of ribbon 29 to the right toward the delivery or output end of the apparatus. The movement of ribbon 29 through corridor 17 is effected primarily by the pulling action of conveyor means 30 and to some extent by a driving action which results from the difference in level of the glass 26 between the pre-forming cell 16 and the point at which ribbon 29 assumes its final uniform thickness.

The movement of ribbon 29 may be further novelly and advantageously controlled by suitably braking or driving rollers 31 through shafts 32. A suitable driving force may be applied to the upper ends of shafts 32 to drive the rollers in either direction and, through the frictional contact of the rollers with the edge of the ribbon, to thereby either assist or retard the longitudinal motion of the ribbon 29. The speed at which the rollers are driven may be so calculated and controlled that the linear speed of the peripheral surfaces thereof in contact with the sheet or ribbon 29 is either faster or slower than or equal to the average or desired forward motion of the ribbon to thereby exert an accelerating, retarding or maintaining effect on the flow of the glass. In some installations, it may be found desirable to drive adjacent rollers at different speeds or in different directions or to apply different braking forces thereto.

The above described novel construction and method make it feasible to start the sheet forming process with molten glass 26 having a viscosity lower than that usable in similar apparatus heretofore known. The glass at such lower viscosity spreads more quickly and evenly to a desired uniform thickness, thereby permitting more rapid movement of ribbon 29 without danger of unpriming. A higher production rate is thus attainable without undesirable effects on the edges of the glass sheet. The molten glass 26 used in the disclosed apparatus may have and preferably has a viscosity between 1,000 and 10,000 poises.

The temperature of the glass ribbon 29 and its supporting bath 11 is controlled by suitably designing and arranging heating units 12 and cooling units 14 and if desired, by providing suitable known types of heating and cooling means above the ribbon 29. The molten glass is thus initially maintained at a suitable temperature to permit flow thereof to the desired width and thickness and is thereafter progressively cooled as it moves along corridor 17 so that by the time it has passed through cooling zone 19 and beyond rollers 31, the viscosity thereof will be sufficiently high to prevent any further modification of its form or the infliction of any surface defects by the external mechanical driving system 30.

In the modification illustrated in FIG. 4, the tank 10 is filled with liquid supporting medium 11 to a level sufficiently above floor 25 to partially submerge rollers 31. In this construction, the glass ribbon 29 is supported throughout its width by the liquid 11, and the edges thereof engage exposed portions of rollers 31 above the upper surface of the supporting liquid.

To facilitate removal of ribbon 29 at the delivery end of corridor 17, it may be desirable in some installations to permit overflow of the liquid medium 11 at the delivery end of trough 20. This may be accomplished by lowering the upper level of the end wall of the trough. In this event, the overflow is recovered and pumped back into well 24 by any suitable known means to maintain the desired liquid level in the tank.

Although only a limited number of embodiments or modifications of the invention have been illustrated in the drawings and described in detail in the foregoing specification, it is to be expressly understood that the invention is not limited thereto. For example, the glass 26 may be fed into pre-forming cell 16 by other means, such as by flow between two cylinders. Various other changes may also be made in the detailed construction and arrangement of the parts illustrated as well as in the materials suggested for use without departing from the spirit and scope of the invention.

What is claimed is:

1. A process of manufacturing flat glass which comprises forming a sheet of glass by deposit of molten glass on molten metal, and causing said sheet to advance on said molten metal at progressively decreasing temperature with the side edges of the sheet in contact with a succession of rolls rotating on discrete vertical or oblique axes.

2. A process as defined in claim 1 which comprises applying a torque to said rollers to rotate the same.

3. A process as defined in claim 2 which comprises rotating different rollers at different speeds.

4. A process as defined in claim 1 comprising continuously supplying the molten glass to the surface of the molten metal in a pre-forming cell to maintain the depth thereof sufficient to cause the glass to spread and flow between said rollers in the form of a ribbon of glass having a thickness less than the depth of the glass in said cell.

5. A process as defined in claim 1 wherein the melted glass has a low viscosity of the order of 1,000 to 10,000 poises.

6. A process of manufacturing sheets of glass of thickness greater than stable equilibrium thickness, comprising the steps of forming a sheet of glass by depositing molten glass on molten metal, and advancing said sheet on said molten metal at progressively decreasing temperature while guiding said advancing sheet between and in edge contact with respective rows of rollers each rotatable about a respective one of a plurality of discrete axes substantially normal to the surface of the molten metal.

7. The process of manufacturing sheets of glass which comprises depositing molten glass on a liquid in a confined space to a depth in excess of that of the thickness to which the glass will freely spread on said liquid, directing and confining the glass on said liquid between and with its edges in contact with respective ones of parallel rows of rollers to form a ribbon of glass while substantially maintaining said thickness, and progressively cooling said glass while moving the same along and between the rows of rollers.

8. A process as defined in claim 7 which comprises independently rotating said rollers in contact with the edges of said ribbon of glass to control the movement of the latter.

9. The process of producing glass in sheet form which comprises floating molten glass on molten metal, flowing the molten glass on the molten metal between rows of rollers having essentially vertical axes of rotation to form a ribbon of glass, and progressively decreasing the temperature of said glass while drawing the ribbon between the rollers with its edges in contact with respective rows thereof and confined therebetween.

10. Apparatus for the production of sheets of glass comprising tank means, a flotation liquid in said tank means, means for supplying melted glass to the surface of said liquid, and means for directing the flow of said glass to form a sheet of glass on the surface of said liquid, said last-named means comprising parallel rows of rollers engageable with and confining between them the edges of said sheet.

11. In apparatus for producing sheets of glass, a refractory tank, a flotation liquid in said tank, and a plurality of rollers aligned in a row and having discrete axes of rotation inclined at an angle to the surface of said liquid, and positioned adjacent the surface of said liquid for engagement with an edge of a sheet of glass supported on said liquid.

12. Apparatus as defined in claim 11 comprising a second row of rollers positioned adjacent the surface of said liquid for engagement with an opposite edge of said sheet of glass.

13. Apparatus as defined in claim 11 wherein said rollers are mounted for free wheeling.

14. Apparatus as defined in claim 11 comprising means for rotating said rollers.

15. Apparatus as defined in claim 11 comprising means for rotating different ones of said rollers at different speeds.

16. Apparatus as defined in claim 11 wherein said tank comprises a pre-forming cell and a forming corridor, said rollers being mounted in said corridor.

17. Apparatus as defined in claim 11 wherein said rollers are partially submerged in said liquid.

18. Apparatus as defined in claim 11 wherein said rollers are mounted in spaced relation to said liquid.

19. The process of manufacturing sheet glass in ribbon form, comprising, depositing molten glass onto a bath of molten metal, to a thickness greater than stable equilibrium thickness, and maintaining said greater thickness by confining the molten glass on the molten metal, between laterally-spaced rows of rollers contacting the respective edges of the ribbon, each said roller lying substantially in the plane of the ribbon and rotating on an axis inclined to the plane of the ribbon, while gradually reducing the temperature of the glass to solidify the same.

20. Apparatus for the continuous production of sheet glass in ribbon form and of thickness greater than stable equilibrium thickness, comprising, a tank having an entrance opening at its one end and an exit opening at its other end, said tank being adapted to contain a bath of molten metal, means to deposit molten glass into said tank at said one end thereof, onto the surface of molten metal therein, and first and second parallel laterally-spaced rows of rollers, each said roller being journaled in said tank for rotation about a respective one of a plurality of axes all substantially normal to the surface of molten metal in said tank, the rollers of each said row extending substantially continuously from a point adjacent said entrance opening, toward said exit opening, each said row of rollers being constructed and arranged to engage a respective edge of a ribbon of glass floating on a bath of molten metal in said tank, and moving from said entrance opening, toward said exit opening, and to confine the ribbon and maintain a thickness thereof greater than stable equilibrium thickness.

References Cited

UNITED STATES PATENTS

| | | | |
|---|---|---|---|
| 2,298,348 | 10/1942 | Coxe | 65—91 |
| 3,222,154 | 12/1963 | Pilkington | 65—91 |

DONALL H. SYLVESTER, *Primary Examiner.*

A. D. KELLOGG, *Assistant Examiner.*